United States Patent Office 2,946,776
Patented July 26, 1960

2,946,776

POLYMERISATION OF ETHYLENICALLY UNSATURATED COMPOUNDS

Gerald Scott, Blackley, and Leslie Seed, Northwich, England, assignors to Imperial Chemical Industries Limited, London, England, a corporation of Great Britain No Drawing. Filed Dec. 23, 1957, Ser. No. 704,258

Claims priority, application Great Britain Jan. 8, 1957

9 Claims. (Cl. 260—88.7)

This invention relates to the polymerisation of ethylenically unsaturated compounds and more particularly to the use of certain mixed anhydrides as catalysts.

According to the present invention there is provided a process for the polymerisation of ethylenically unsaturated compounds characterised in that as catalyst there is used at least one mixed anhydride of hyponitrous acid and organic carboxylic acids.

In the case of monocarboxylic acids, the mixed anhydrides to be used as catalysts in the process of this invention have the general formula

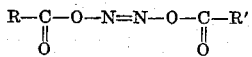

wherein R and R' stand for hydrogen, alkyl, cycloalkyl, aryl, alkyl/aryl or heterocyclic groups, unsubstituted or substituted for example with alkoxy, alkyl, cycloalkyl, or aryl groups or with halogens and may be the same or different. In the case of polycarboxylic acids, the mixed anhydrides may have a cyclic or polymeric structure, containing the following unit

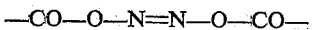

The mixed anhydrides may in general be prepared by interaction between silver hyponitrite and at least one organic carboxylic acid halide, preferably the chloride, of the formula

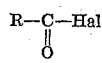

Other salts of hyponitrous acid, such as the lead, lithium, thallium, copper or potassium salts, may also be used.

The products of the reaction between silver hyponitrite and organic carboxylic acid halides are relatively unstable materials and may be obtained in differing degrees of stability according to the conditions under which the reaction is carried out. The less stable products are preferred for use as catalysts and their formation is favoured by performing the reaction in an inert reaction medium such as petroleum hydrocarbons, aromatic hydrocarbons, esters, ketones, chlorinated hydrocarbons, etc.; such media may be gaseous at normal temperatures but liquid at reaction temperature. When ethereal solvents such as diethyl ether, tetrahydrofuran, diethyldiethylene glycol, di-n-butyl ether, etc. are used, more stable products tend to predominate, and at low temperatures these are less effective polymerisation catalysts. The production of the more stable products is connected with the tendency of ethereal solvents to contain peroxides which are difficult to remove completely, and the production of more stable products is also associated with the use of impure silver hyponitrite which may have become oxidised.

Moreover, in order to obtain the less stable forms it is necessary to maintain a low temperature of the reaction mixture, in any event below 0° C. and preferably below —30° C. Temperatures as low as —110° C. may be successfully used. Short reaction times are desirable and may be favoured by small particle size and an excess of the hyponitrite salt.

When sufficient time for reaction has elapsed the silver halide may be removed for example by filtration, preferably forthwith. In some cases, for example using hydrocarbon solvents, product may be absorbed on the inorganic halide and may be eluted therefrom by treatment with a more polar solvent such as diethyl oxalate. In some cases unreacted organic halide may also be absorbed on the silver salt. It is necessary therefore to provide a satisfactory combination of reaction conditions so that unreacted halide is not eluted simultaneously with the desired product. The so-obtained solution of the mixed anhydride may be used as such in the process of the present invention, or the mixed anhydride may first be isolated therefrom for example by evaporation of the solvent at low temperature or by crystallisation at low temperature. The pure mixed anhydrides may be dangerously unstable and isolation is usually avoided.

As examples of the mixed anhydrides for use in the process of this invention there may be mentioned the mixed anhydrides of hyponitrous acid and carbonic acid, formic acid, acetic acid, propionic acid, butyric acid, isobutyric acid, higher fatty acids such as lauric acid, similar acids with substituents on the alpha, beta, gamma, etc. carbon atoms of the fatty acid radical chain, for example trimethylacetic acid, trichloroacetic acid, tetrahydrofuroic acid, benzoic acid, 3:5:5-trimethylhexanoic acid, p-ethoxybenzoic acid, 2:4:6-trimethoxybenzoic acid, o-chlorbenzoic acid, cinnamic acid, p-toluic acid, 2:3-dihydrofuran-5-carboxylic acid, adipic acid, succinic acid, glutaric acid, sebacic acid, phthalic acid, isophthalic acid, trimesic acid, fumaric acid, itaconic acid, citraconic acid, alkoxyacetic acid or mixtures thereof. In the case of polycarboxylic acids, the mixed anhydrides may contain unreacted acid halide groups.

Preferred mixed anhydrides are those from acetyl chloride, 3:5:5-trimethylhexanoyl chloride, and octanoyl chloride.

Ethylenically unsaturated compounds that may advantageously be polymerised or copolymerised according to the process of this invention include ethylene, styrene, methyl methacrylate, vinyl acetate, butadiene and isoprene. Further examples are acrylamine, acrylonitrile, vinyl chloride, vinyl benzoate, vinylidene chloride, fluoroethylenes, methacrylonitrile, methacrylamide, halogenated styrenes, vinyl pyrolidone, vinyl phthalimide, vinyl carbazole, diallyl oxalate, diallyl fumarate, dimethallyl oxalate, dimethallyl fumarate, methyl acrylate, diethylene glycol dimethacrylate, methyl maleate, methyl fumarate, ethylene glycol maleate, ethylene glycol itaconate, propylene glycol maleate, or the corresponding polyethylene glycol or polypropylene glycol maleates, fumarates or itaconates.

The polymerisation may be performed with the use of the new catalysts under the conditions that are appropriate for the desired results. Thus, for example, it may be carried out at normal or elevated or reduced pressures or temperatures and in the presence or absence of inert solvents or other diluents such as gaseous or liquid hydrocarbons.

The less stable mixed anhydrides used as catalysts in the present invention are remarkably more efficient than the catalysts that have hitherto been used. Thus, for example, using a mixed anhydride prepared from silver hyponitrite and acetyl chloride in the polymerisation of ethylene at superatmospheric pressures and at elevated temperatures to give polythene, for equal rates of polymerisation under otherwise similar conditions the necessary reaction temperature is about 100° C. less than that required when lauroyl peroxide is used as catalyst. Alternatively, at a given reaction temperature these catalysts enable a much higher rate of polymerisation to be achieved. A similar desirable effect is observed in the polymerisation of other monomers such as vinyl acetate. The catalysts are particularly valuable when it is desired to obtain polythenes possessing greater stiffness and higher density than normal, because one suitable way of making such polythenes is to operate the polymerisation reaction at lower temperatures than those normally employed, and the catalysts are sufficiently active to enable satisfactory reaction rates to be achieved at such lower temperatures. The catalysts may be used in ethylene polymerisation in the presence of added chain-transfer agents for example hydrogen, carbon tetrachloride or chloroform. A suitable proportion of the chain-transfer agent hydrogen is 0.50% to 2.5% by volume of the ethylene measured at atmospheric pressure. A suitable proportion of the chain-transfer agents carbon tetrachloride and chloroform is 0.05% to 1.0% by weight of the ethylene. When using these catalysts in polythene manufacture the ordinary reaction pressures, generally above 500 atmospheres, preferably between 1000 and 2000 atmospheres, are maintained. A suitable proportion of catalyst is between 5 and 500 parts per million of ethylene. Larger proportions may be used according to the conditions. The choice of reaction temperature in polythene manufacture when using the new catalysts according to this invention is governed by whether a high rate of polymerisation at moderately elevated temperature, for example between about 50° C. and 180° C. is desired, or a moderate rate at lower temperatures, for example between about −45° C. annd 110° C. The useful range is from about −30° C. to 100° C. and it is very convenient to operate in a batch process between −20° C. and 10° C. and in a continuous process between 10° C. and 80° C.

The invention is illustrated but not limited by the following examples in which parts and percentages are by weight.

*Example 1*

9.5 parts of a solution of isobutyryl hyponitrite in dimethylformamide containing 0.13 part of isobutyryl hyponitrite are added to 167 parts of vinyl acetate and the air removed from the reaction vessel. Polymerisation is observed after 6 mins. at −10° C. Similarly, the catalyst solution causes polymerisation of acrylonitrile and methyl methacrylate at −10° C.

The solution of isobutyryl hyponitrite used in these experiments is prepared as follows. 2.76 parts of silver hyponitrite are added to a mixture of 19 parts of dimethylformamide and 2.2 parts of isobutyryl chloride previously cooled to −60° C. in a stream of dry nitrogen. After stirring the reaction mixture of 2 hours at −60° C. the white residue is filtered and washed with dimethylformamide at −60° C. and the filtrate and washings combined.

*Example 2*

8.7 parts of a solution of isobutyryl hyponitrite in toluene containing 0.042 part of isobutyryl hyponitrite are added to 93 parts of vinyl acetate and the air removed from the reaction mixture. Polymerisation is observed after 6 mins. at −10° C. Similarly the catalyst solution causes polymerisation of acrylonitrile at −10° C.

The solution of isobutyryl hyponitrite used in these experiments is prepared as follows. 2.76 parts of silver hyponitrite are added to a mixture of 17.4 parts of toluene and 2.2 parts of isobutyryl chloride previously cooled to −40° C. in a stream of dry nitrogen. After stirring the reaction mixture for 3 hours at −40° C. the yellow residue is filtered and washed with dimethylformamide and the filtrate and washings combined.

*Example 3*

9.5 parts of a solution of p-tert.butylbenzoyl hyponitrite in dimethylformamide containing 0.085 part of p-tert.butylbenzoyl hyponitrite are added to 91 parts of acrylonitrile and the air removed from the reaction vessel. Polymerisation is observed after 10 mins. at 30° C. The catalyst solution also causes polymerisation of vinyl acetate at 30° C.

The solution of p-tert.butylbenzoyl hyponitrite used in these experiments is prepared as follows. A mixture of 19 parts of dimethylformamide and 3.96 parts of p-tert.-butylbenzoyl chloride is stirred for 15 mins. at −40° C. under a stream of dry nitrogen, and 2.76 parts of silver hyponitrite added to the resulting solution. After stirring the reaction mixture at −40° C. for 2½ hours the pale-coloured residue is filtered and washed with dimethylformamide. Filtrate and washings are combined.

*Example 4*

19 parts of a solution of o-toluyl hyponitrite in dimethylformamide containing 0.1 part of o-toluyl hyponitrite are added to 93 parts of vinyl acetate, and the air removed from the reaction vessel. Polymerisation is observed after 10 mins. at 0° C. The catalyst solution also polymerises acrylonitrile at 0° C.

The solution of o-toluyl hyponitrite used in these experiments is prepared as follows. 2.76 parts of silver hyponitrite are added to a mixture of 19 parts of dimethylformamide and 3.01 parts of o-tolyl chloride previously cooled to −40° C. in a stream of dry nitrogen. After stirring the reaction mixture for 2 hours at −40° C. the white residue is filtered and washed with dimethylformamide at −40° C. Filtrate and washings are combined.

*Example 5*

70 parts of silver hyponitrite and 40 parts of acetyl chloride are stirred in 1000 parts of A.R. acetone in the presence of a trace of pyridine hydrochloride (roughly 0.05 part) at −35° C. for 1½ hours and the mixture is then filtered.

100 parts of the solution, containing 2 parts of the mixed anhydride of hyponitrous acid and acetic acid, are charged to an evacuated high-pressure autoclave, cooled to −55° C. Liquid ethylene at −68° C. and 1000 atmospheres pressure is then injected into the autoclave. The internal temperature is momentarily raised to −12° with the heat of compression, but in 5 mins. is reduced to −33° at a pressure of 980 atm.

The stirrer of the autoclave is started and the system is gradually warmed to −5° C. during 50 mins., the pressure rising to 1015 atm. In 2¼ hours after reaching −5° C. the pressure has fallen to 965 atm. The pressure is released and the vessel is allowed to warm to room temperature and opened.

It is found to contain 230 parts of white solid. The polymer is purified by solution in xylene, precipitation in methanol, filtration and drying in vacuo. 200 parts of a white solid ethylene polymer of density 0.9544, grade number 0.76, are recovered.

*Example 6*

100 parts of acetone containing 2 parts of the mixed anhydride of hyponitrous acid and acetic acid prepared as in Example 5 are charged into an evacuated high pressure vessel at −45° C. 5 atm. of hydrogen and 1000 atm. of ethylene are introduced at −52° C. The temperature temporarily rises to −14° C. but settles to −55.5° C. in 6 mins. at a pressure of 1000 atm. The stirrer of the autoclave is started and the system is warmed to −5° C. over 54 mins.; the pressure rises to 1155 atm. In 1 hr. 40 mins. after reaching −5° C. the pressure has fallen to 1055 atm. The pressure is released and the vessel allowed to warm up to room temperature. It is found to contain 230 parts of a white solid which when treated as in Example 5 yields 200 parts of a white solid ethylene polymer of density 0.954 and grade number 0.012.

*Example 7*

Example 5 is repeated with the variation that the high-pressure vessel also contains 25 parts of a solution containing 5 parts of carbon tetrachloride in 100 parts of thiophene-free benzene. During 2 hrs. 35 mins. after reaching a temperature of —5° C. the pressure falls from 1165 atm. to 1070 atm. The final yield is 210 parts of a white solid ethylene polymer of density 0.961 and grade number 0.054.

*Example 8*

400 parts of acetone containing 9 parts of mixed anhydride of acetic acid and hyponitrous acid prepared as in Example 5 are used in the polymerisation of ethylene according to the method described in the same example. The polymerisation temperature is allowed to rise to +15° C. at a maximum pressure of 640 atm. The final yield is 90 parts of a white solid ethylene polymer of density 0.953.

*Example 9*

Example 5 is repeated but at a polymerisation temperature of —30° C. and a maximum pressure of 2000 atm. The final yield is 70 parts of white solid ethylene polymer of density 0.950 and grade number 0.002.

*Example 10*

The procedure of Example 5 is repeated using 300 parts of acetone containing 11 parts of mixed anhydride of octanoic acid and hyponitrous acid; the anhydride is prepared by the technique described in Example 5. The final yield is 200 parts of white solid ethylene polymer of density 0.967 and grade number 6.

*Example 11*

40 parts of acetyl chloride and 120 parts of silver hyponitrite are reacted at —35° C. for 1½ hours in 2000 parts of n-hexane and then the mixture is filtered. The residue is washed with 1500 parts of diethyl oxalate. 800 parts of this diethyl oxalate solution containing 6.8 parts of mixed anhydride of acetic acid and hyponitrous acid are used in the polymerisation of ethylene by the procedure described in Example 5. The final yield is 490 parts of white solid ethylene polymer of density 0.9510, grade number 3.7, Vicat softening point 108° and 0.35 methyl group/100° C.

*Example 12*

10 parts of a solution containing 3.7 parts of mixed anhydride of hyponitrous acid and 3:5:5-trimethylhexanoic acid are used in the polymerisation of ethylene by the procedure of Example 5. The final yield is 80 parts of a white solid ethylene polymer.

*Example 13*

366 parts of adipyl chloride and 607 parts of silver hyponitrite are mixed at —30° C. for 3 hours in 5000 parts of acetone and the mixture is then filtered. 2000 parts of this solution of the mixed anhydride of adipic acid and hyponitrous acid is used in the polymerisation of ethylene according to the procedure of Example 5. The product is a green paste which when treated as in Example 5 yields 10 parts of an off-white solid ethylene polymer.

*Example 14*

1000 parts of acetone solution containing 20 parts of mixed anhydride of benzoic acid and hyponitrous acid are used in the polymerisation of ethylene according to the procedure of Example 5. The product is a light brown solid which when treated as in Example 5 yields 160 parts of white solid ethylene polymer.

*Example 15*

5 parts of solid mixed anhydride of lauric acid and hyponitrous acid are dissolved in 800 parts of ether solution and used in the polymerisation of ethylene at 0° C. according to the procedure of Example 5. The product is a light green solid which when treated as in Example 5 yields 100 parts of white solid ethylene polymer of density 0.968 and grade number 1.

What we claim is:

1. Process for the polymerization and interpolymerization of an ethylenically unsaturated monomer that undergoes addition polymerization, which comprises polymerizing said monomer in the presence of a catalytic amount of a mixed anhydride selected from the group consisting of (1) mixed anhydrides containing the residue of hyponitrous acid and the residue of an organic monocarboxylic acid, said anhydrides having the formula:

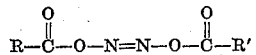

in which R and R' are selected from the group consisting of alkyl, chloro-lower alkyl, phenyl, lower-alkoxy phenyl, chlorophenyl, lower alkyl phenyl, β-phenyl vinyl, tetrahydrofuryl and 2,3-dihydrofuryl-5 radicals and (2) mixed anhydrides containing the residue of hyponitrous acid and the residue of a polycarboxylic organic acid selected from the group consisting of alkylene dicarboxylic acids, phenylene dicarboxylic acids and trimesic acid.

2. Process for polymerising ethylene as claimed in claim 1 in which an effective amount of a chain-transfer agent selected from the group consisting of hydrogen, carbon tetrachloride, and chloroform, is present together with the ethylene in the reaction mixture.

3. Process as claimed in claim 1 in which the ethylenically unsaturated compound is vinyl acetate.

4. Process as claimed in claim 1 in which the ethylenically unsaturated compound is acrylonitrile.

5. The process of claim 1 wherein said anhydride is the mixed anhydride of hyponitrous acid and acetic acid.

6. The process of claim 1 wherein said anhydride is the mixed anhydride of hyponitrous acid and 3,5,5-trimethyl hexanoic acid.

7. The process of claim 1 wherein said anhydride is the mixed anhydride of hyponitrous acid and octanoic acid.

8. Process as claimed in claim 1 in which the ethylenically unsaturated compound is ethylene the temperature is between —45° C. and 180° C. and the pressure is greater than 500 atmospheres.

9. Process for polymerising ethylene as claimed in claim 8 in which the pressure is between 1000 and 2000 atmospheres and the temperature between —30° C. and 100° C.

References Cited in the file of this patent

UNITED STATES PATENTS

| | | |
|---|---|---|
| 2,471,959 | Hunt | May 31, 1949 |
| 2,492,763 | Pinkney | Dec. 27, 1949 |
| 2,666,758 | Johnson | Jan. 19, 1954 |
| 2,758,107 | Heiligman | Aug. 7, 1956 |
| 2,865,903 | Seed | Dec. 23, 1958 |

FOREIGN PATENTS

| | | |
|---|---|---|
| 618,168 | Great Britain | Feb. 17, 1949 |
| 771,414 | Great Britain | Apr. 3, 1957 |
| 796,728 | Great Britain | June 18, 1958 |